United States Patent Office 2,868,154
Patented Jan. 13, 1959

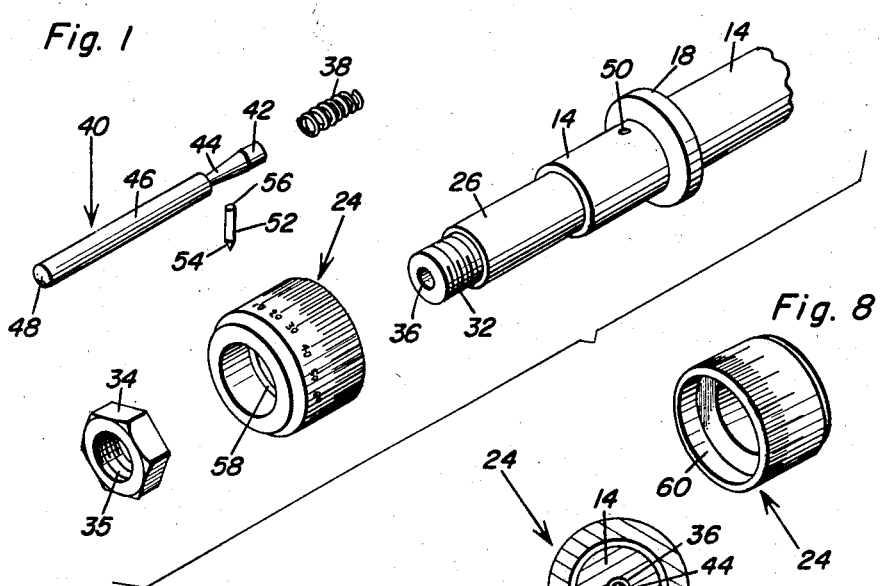
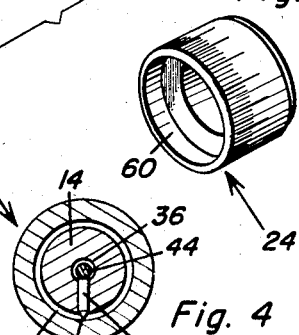
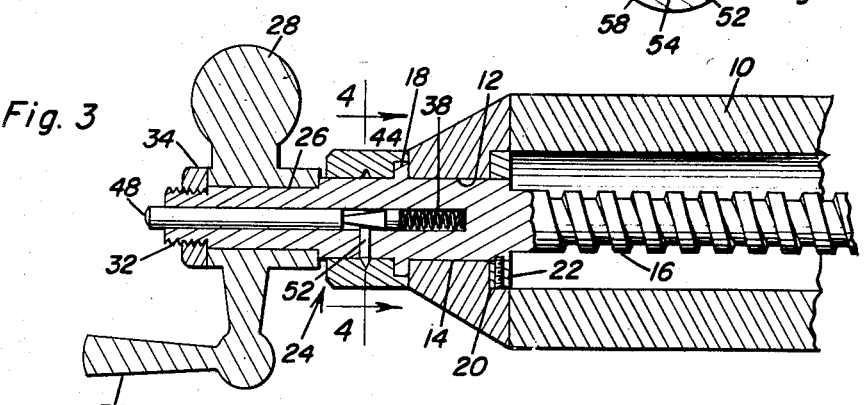
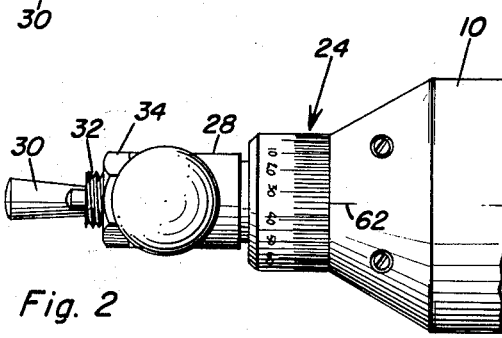
Jan. 13, 1959 N. ORAM 2,868,154
MACHINE DIAL CONTROL
Filed June 18, 1957 2 Sheets-Sheet 1
Norman Oram
INVENTOR.

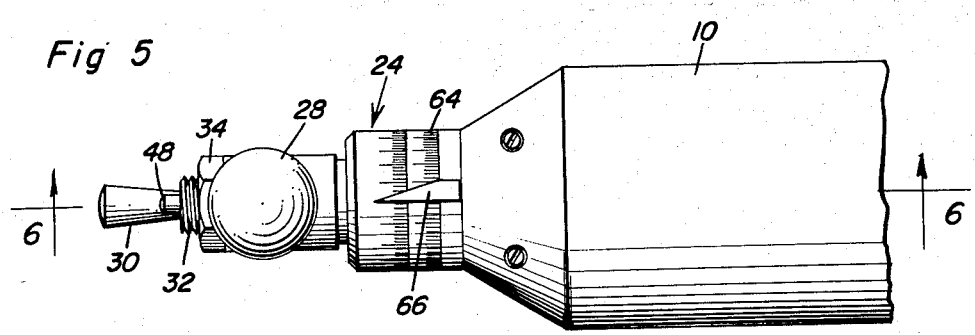
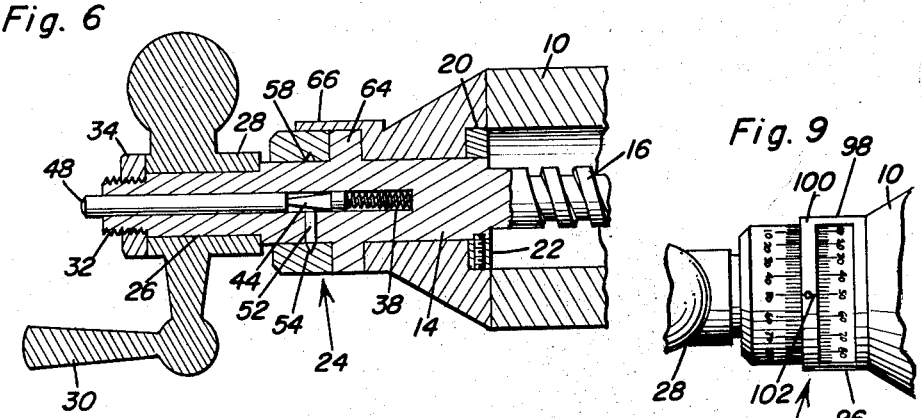
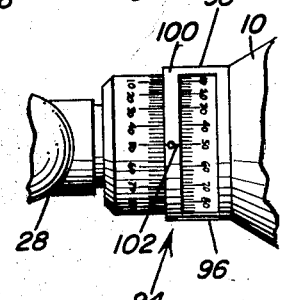
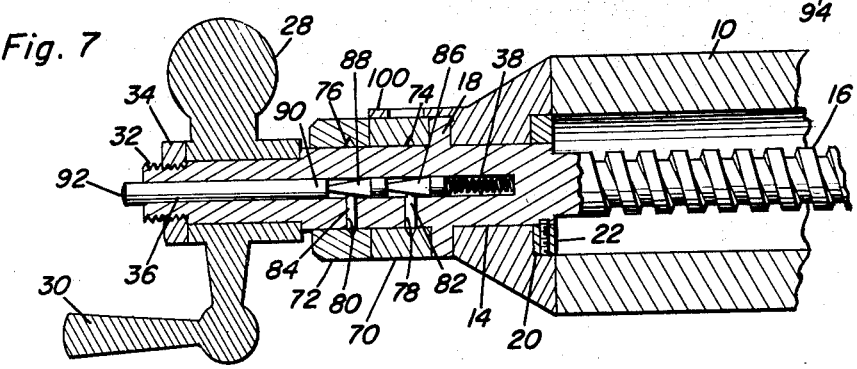

2,868,154

MACHINE DIAL CONTROL

Norman Oram, Devils Lake, N. Dak.

Application June 18, 1957, Serial No. 666,428

5 Claims. (Cl. 116—115.5)

This invention relates in general to machine tools and more particularly to an improved machine dial control for a movable dial of the machine tool.

In machine tools having a feed screw there is usually provided an indicating dial on the machine screw adjacent to the operating handle, which may be set relative to a scribed line on the machine tool. Ordinarily, the indicating dial is retained by means of an Allen setscrew or by mere frictional engagement. When provided with an Allen setscrew and it is necessary to change the indicating dial, the operator must loosen the setscrew, rotate the dial to the desired position, and then retighten the setscrew. Oftentimes the setscrew is rotated to an inaccessible position and therefore some time may be consumed in making such a change. Further, the feed screw may be moved while making such a change, thus preventing an accurate setting of the indicating dial. When the indicating dial is retained by means of frictional engagement, the dial may or may not retain the original setting and therefore this type of dial is somewhat inaccurate.

Therefore, the primary object of this invention is to provide a machine dial control which may be easily operated and which positively retains the indicating dial in a desired position.

Another object of this invention is to provide a dial control for machine tools which may be easily incorporated into already existing machine tools or which may be incorporated in the machine tool at the time of manufacture with very little added cost.

A further object of this invention is to provide a dial control mechanism for machine tools which may be utilized for controlling several indicating dials which may be located on a single machine tool feed screw.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an exploded perspective view of a machine tool feed screw, the indicating dial therefor, and the machine dial control with a portion of the feed screw broken away;

Figure 2 is a top plan view of a machine tool feed screw and housing therefor with a portion of the housing broken away;

Figure 3 is a sectional view taken substantially along section line 3—3 of Figure 2 and showing the relationship between the various components of the machine feed screw and a dial control;

Figure 4 is a sectional view taken substantially along section line 4—4 of Figure 3;

Figure 5 is a top plan view of another type machine tool screw and housing;

Figure 6 is a sectional view taken substantially along section line 6—6 of Figure 5;

Figure 7 is a sectional view similar to Figure 6 but showing still another type of machine feed screw having two movable indicating dials and one multiple type machine dial control therefor;

Figure 8 is a perspective view of the feed screw indicating dial showing the recess thereof; and Figure 9 is a fragmentary top plan view of the type of fixed indicator mark which may be utilized with the double indicating dial shown in Figure 7.

Referring now to the drawings in detail and more particularly to Figure 3 the machine dial control may be utilized on any type of machine tool having a feed screw with an indicating dial thereon. For example, the cross feed on a lathe or milling machine of any similar type machine tool. Such a feed screw would include a housing 10 having a journal 12 at one end thereof which receives a bearing 14 of the feed screw 16. The feed screw 16 is also provided with an outer thrust collar 18 which is formed integral with the feed screw. The bearing 14 also receives thereon a movable inner thrust collar 20, which is retained in position on the bearing by means of an Allen setscrew 22. The bearing 14 extends outward of the housing 10 and also receives thereon an indicating dial, which is referred to in general by the reference numeral 24. Outward of the indicating dial 24 the feed screw is provided with a reduced portion 26, which receives thereon a manually operated crank 28 having a handle 30. The extension of the feed screw adjacent the outer end thereof is further reduced and provided with an external thread 32 which receives thereon a nut 34 having internal threads 35. The nut 34 serves to retain the operating crank 28 in position on the feed screw. Up to this point, the elements which have been described are to be found on most machine tools having feed screws and therefore it is deemed unnecessary to go into further detail of the structure thereof.

It will be noted that the outer end of the feed screw is provided with an axially extending bore 36 which receives therein a compression spring 38, the purpose of which will be described hereinafter. The bore 36 further receives a cylindrical operating rod, which is referred to in general by the reference numeral 40, and which extends from the spring 38 to a point beyond the end of the threaded portion 32. The operating rod on the inner end 42 thereof is cylindrical in configuration, which portion terminates in the base of a frusto-conical cam surface 44, the smaller end of which is attached to an elongated cylindrical portion 46 and which finally terminates on the outer end in a rounded portion 48.

The bearing surface 14 immediately under the indicating dial 24 is provided with a radially extending aperture 50 which receives freely slidable therein a cylindrical pin 52. The cylindrical pin at the outer end, is formed into a cone-shaped extension 54, and at the inner end 56 is slightly rounded. The outer end 54 of the pin 52 is received in a V-groove 58, which is suitably machined on the inner surface of the indicating dial 24. The inner end 56 of the pin 52 engages the frusto-conical portion 44 of the operating rod 40.

The indicating dial 24, as will be particularly noted in Figure 8, is provided with an annular recess 60 which provides clearance for the outer thrust bearing 18 in order that the inner surface of the indicating dial 24 may be in close proximity to the outer surface of the housing 10 on which there is located a fixed indicator mark 62.

While the operation of this device should be obvious, a brief explanation follows. When it is desired to set the indicating dial 24 at some particular point with respect to the fixed indicator 62, the operating rod 40 may be pressed inward against the compression spring 38 thus releasing the camming action of the frusto-conical cam 44 on the pin 52. This in turn releases the frictional engagement of the point 54 with the groove 58 and the indicating dial may be rotated to any desired position. When such a position is reached the operating rod may be released and the cam surface 44, under the spring pressure of the spring 38 will move outward thus forcing the pin 52 radially outward into engagement with the groove 58.

Figures 5 and 6 show a slightly modified form of construction of the feed screw and housing therefor with a second indicating dial 64 being shown attached to the feed screw in place of the outer thrust bearing 18. Inasmuch as a single line fixed indicator similar to 62 would not suffice on such a structure an overlying indicator 66 is utilized which extends over both the fixed dial 64 and the dial 24. Further, inasmuch as the remainder of the structure is identical with that previously described like reference numerals have been used thereon. With this type of construction, the fixed indicating dial may be utilized as a constant reference, with the dial 24 being used in the same manner as heretofore described.

Referring now to Figures 7 and 9 it will be noted that the bearing 14 of feed screw 16 is somewhat elongated in order to receive thereon a pair of indicating dials 70 and 72. The dials 70 and 72 each have formed thereon, on the inner surface thereof, the grooves 74 and 76 respectively. The bearing surface 14 has formed therein, and in registry with the grooves 74 and 76, radially extending apertures 78 and 80 which receive pins 82 and 84 therein. The inner ends of the pins 82 and 84 are engaged by frusto-conical surfaces 86 and 88 respectively which are formed integral with operating rod 90 in the axial bore 36. The rod 90 terminates in an outer end 92. With this structure, two indicating dials 70 and 72 may be controlled in the manner in which the dial 24 is controlled in the previous forms described. In order that the indicia on dials 70 and 72 may be aligned with a fixed indicator there is provided a semicircular extension on the housing 10, which is referred to in general by the reference numeral 94. The extension 94 is provided with diametrically opposed legs 96 and 98 which, at their outer ends carry a semi-circular strap 100 having at the center thereof the fixed indicator 102. The strap 100 is immediately adjacent to the juncture between the indicating dials 70 and 72 and therefore the lines thereon may be readily aligned with the fixed indicator 102.

When utilizing the form of the invention as disclosed in Figures 7 and 9, the dials 70 and 72 may be set for example when utilized an a lathe, to indicate the tool settings for two separate diameters of a work piece to be turned. The manner of operation would be identical with the previous form of the invention.

The collar 18 may be constructed with a diameter equal to the dial 24 and the peripheral surface of the collar 18 may be provided with unnumbered graduation lines which also may be provided with a color code for aiding in the setting the dial. This is similar to Figures 5 and 6 with the pointer 66 omitted. The point 54 on pin 52 may be ball-shaped with the groove 58 being complementary thereto. The shape and size of the parts may vary in accordance with the individual installations.

Another purpose of the double dial arrangement in Figure 9 is for making inside and outside readings on a lathe. An outside reading may be made on the left hand side while an inside reading may be made on the right hand scale.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination with the feed mechanism of a machine tool having a feed screw, a housing in which said feed screw is journaled, and indicating dial rotatably carried by said screw, and a manually operable handle immovably attached to the outer end of said feed screw; and indicating dial control including cam operated means frictionally engaging the inner surface of said dial to prevent relative rotation between said dial and said screw, a longitudinally extending cam movably mounted in the feed screw and operatively engaging said cam operated means, means forming a handle for manually disengaging said cam from said cam operated means, and a spring normally urging said cam into engagement with said cam operated means.

2. In combination with the feed mechanism of a machine tool having a feed screw, a housing in which said feed screw is journaled, an indicating dial rotatably carried by said screw, and a manually operable handle immovably attached to the outer end of said feed screw; an indicating dial control including cam operated means frictionally engaging the inner surface of said dial to prevent relative rotation between said dial and said screw, a longitudinally extending cam operatively engaging said cam operated means, means for manually disengaging said cam from said cam operated means, and a spring normally urging said cam into engagement with said cam operated means, said cam operated means comprising a radially extending pin journaled in said screw and freely slidable therein, said cam including a frusto-conical surface, said disengaging means comprising an operating rod formed integral with said cam, an axial bore in said screw, said cam and operating rod being slidably received in said axial bore whereby the outer end of said rod is accessible in the same position regardless of the position of the screw for manual longitudinal movement to disengage said pin from frictional engagement with said dial.

3. In combination with the feed mechanisn of a machine tool having a fed screw, a housing in which said feed screw is journaled, a plurality of indicating dials rotatably carried by said screw, and a manually operable handle immovably attached to the outer end of said feed screw; an indicating dial control including cam operated means frictionally engaging the inner surfaces of said dials to prevent relative rotation between said dials and said screw, longitudinally extending cams operatively engaging said cam operated means, means for manually disengaging said cams from said cam operated means, and a spring normally urging said cams into engagement with said cam operated means, said cam operated means comprising radially extending pins journaled in said screw and freely slidable therein, said cams including frusto-conical surfaces, said disengaging means comprising an operating rod formed integral with said cams, an axial bore in said screw, said cams and operating rod being slidably received in said axial bore whereby the outer end of said rod is accessible in the same position regardless of the position of the screw for manual longitudinal movement to disengage said pins from frictional engagement with said dials, said dials having annular V-grooves formed on the inner surfaces, said pins having conical points on the outer ends for engagement in said V-grooves.

4. In combination with the feed mechanism of a machine tool having a feed screw, a housing in which said feed screw is journaled, an indicating dial rotatably carried by said screw, and a manually operable handle rigidly attached to the outer end of said feed screw; an indicating dial control including cam operated means frictionally engaging the inner surface of said dial to prevent relative rotation between said dial and said screw, a longitudinally extending cam operatively engaging said cam operated means, means for manually disengaging said cam from said cam operated means, and a spring normally urging said cam into engagement with said cam operated means, said cam operated means comprising a radially extending pin journaled in said screw and freely slidable therein, said cam including a frusto-conical member, said disengaging means comprising an operating rod formed integral with said cam, an axial bore in said screw, said cam and operating rod being slidably received in said axial bore whereby the outer end of said rod is accessible for manual longitudinal movement of the cam to disengage said pin from frictional engagement with said dial whereby the outer end of said rod maintains a constant position regardless of the rotation of the screw.

5. A dial control device comprising a shaft having one end extending through a support bearing provided with a stationary reference mark, a handle on said shaft for manually rotating said shaft, a dial journaled on said shaft for registry with said reference mark for indicating the degree of rotation of the shaft, and means selectively interconnecting the shaft and dial for locking the dial to the shaft and permitting initial adjustment of the dial in relation to the shaft to align a predetermined point thereon with the reference mark, said interconnecting means including a radially movable lock pin having one end engaging the dial, said shaft having a longitudinal bore extending from one end thereof, a radial bore communicating with the longitudinal bore and the dial, said radial bore receiving said pin with the pin having the inner end disposed within the bore, a cam longitudinally slidably mounted in the longitudinal bore in engagement with the inner end of the pin, spring means engaging the cam and moving the same longitudinally and urging the pin outwardly for frictionally engaging the dial, and a longitudinal extension on said cam projecting from the end of the shaft and forming a handle for moving the cam away from the pin while overcoming the pressure exerted by the spring means, said longitudinal bore and extension being coincidental to the center of rotation of the shaft thereby disposing the handle on the extension in a constant position during rotation of the shaft and handle thereon.

References Cited in the file of this patent

UNITED STATES PATENTS

| | | |
|---|---|---|
| 2,131,129 | Whitehead | Sept. 27, 1938 |

FOREIGN PATENTS

| | | |
|---|---|---|
| 195,403 | Switzerland | July 1, 1938 |
| 932,459 | France | Nov. 24, 1947 |